United States Patent [19]

Baumgaertner

[11] 4,022,659
[45] May 10, 1977

[54] NUCLEAR POWERPLANT WITH CLOSED GAS-COOLING CIRCUIT FOR PRODUCTION OF PROCESS HEAT

[75] Inventor: Heinrich Baumgaertner, Ketsch, Germany

[73] Assignee: Hochtemperatur-Reactorbau GmbH, Cologne, Germany

[22] Filed: Mar. 7, 1975

[21] Appl. No.: 556,425

[30] Foreign Application Priority Data

Mar. 8, 1974 Germany .................. 2411039

[52] U.S. Cl. .................................. 176/60; 176/65; 176/87; 60/644
[51] Int. Cl.² .......................................... G21C 3/56
[58] Field of Search ............... 176/55, 60, 65, 87; 60/644, 650, 682

[56] References Cited

UNITED STATES PATENTS

| | | | |
|---|---|---|---|
| 3,210,254 | 10/1965 | Fortescue | 176/60 |
| 3,357,892 | 12/1967 | Schmidt | 176/65 X |
| 3,663,364 | 5/1972 | Thompson et al. | 176/65 |
| 3,713,972 | 1/1973 | Coast et al. | 176/60 |
| 3,742,707 | 7/1973 | Andrews et al. | 176/60 X |
| 3,788,944 | 1/1974 | Stracke et al. | 60/644 X |
| 3,897,838 | 8/1975 | Hosegood | 176/60 |

Primary Examiner—Peter A. Nelson
Attorney, Agent, or Firm—Bacon & Thomas

[57] ABSTRACT

A power plant having a closed gas-cooling circuit for the production of process heat to be transferred to a secondary circuit, comprising: (a) a vessel comprising a generally solid block of material; (b) a high-temperature reactor positioned within the vessel; (c) a plurality of heat exchanger units positioned about said reactor in the reactor in the vessel, the heat exchanger units comprising each a high temperature heat exchanger and a low temperature heat exchanger coupled serially therewith, each of the heat exchanger units being removably mounted in a vertically oriented shaft in the material; (d) first means for conducting a portion of a hot gas stream leaving the reactor to each of the high temperature heat exchangers where the hot gas is partially cooled by indirect contact with a working fluid in the secondary circuit; (e) second means for conducting said cooled gas from each of the high temperature heat exchangers to said low temperature heat exchangers coupled therewith where the gas is further cooled by indirect contact with the secondary circuit fluid; and means for returning said further cooled gas to the reactor from each of the low temperature heat exchangers by circulating the gas around the periphery of each respective heat exchanger unit.

23 Claims, 4 Drawing Figures

NUCLEAR POWERPLANT WITH CLOSED GAS-COOLING CIRCUIT FOR PRODUCTION OF PROCESS HEAT

BACKGROUND OF THE INVENTION

1. Field of the Invention

The present invention relates to heat transfer systems for nuclear power generating stations, and more particularly to gas cooled nuclear power generators having a self-contained gas cooling circuit for the generation of process heat through the transfer of energy from the gas cooling circuit to a secondary circuit, and in which the high temperature reactor, the heat exchanger units, the blower, and the gas conduits between the several system components are all arranged inside a vessel of prestressed concrete (one-vessel construction).

2. Description of the Prior Art

It is known to build nuclear power generators with a self-contained gas turbine circuit as an integral unit, in which not only the reactor, but also the gas turbine, a compressor, and the heat exchanger units are arranged inside a vessel of prestressed concrete. German Offenlegungsschrift No. 2,062,934 discloses a gas cooled nuclear reactor the gas turbine of which occupies a cavity inside the wall of the pressure vessel surrounding the reactor core. Another nuclear reactor installation of similar construction is described in German Offenlegungsschrift No. 1,764,249, featuring a design in which the nuclear reactor and all the components of the cooling circuit are accommodated inside closely spaced parallel vertical bores in the concrete pressure vessel, and where the components are accessible from the outside. Conduits for the cooling medium are arranged in the wall of the pressure vessel as well as between the various bores.

It has further been suggested in a copending application to arrange the heat exchanger units inside vertical shafts or pods which are arranged in a circle around the axis of the concrete vessel, and to arrange the gas turbine unit inside a horizontal tunnel underneath the reactor core. This design further includes the suggestion of subdividing the total cooling circuit downstream of the gas turbine unit into several partial circuits of identical size. These partial circuits receive their gas flow through feeder conduits leading to separate annular-shaped channels of which each links together a group of heat exchangers.

A common feature of the reactor systems described above is that they all have a self-contained gas cooling circuit which is entirely integrated into a vessel of reinforced concrete. It is upon this basis that the present invention builds and over which various improvements are being suggested. However, the present invention and the previous designs differ in one basic aspect. Whereas the previous systems utilize the energy generated by the reactor core for the operation of a gas turbine which drives an electric generator, the system of the present invention features a cooling gas circuit from which the reactor-generated energy is transferred to a secondary circuit for the generation of process heat. Such an energy transfer arrangement in a nuclear reactor installation presupposes a sufficiently high gas temperature at the exit from the reactor core, meaning that this temperature has to be at least 850° C. Such high gas temperatures, in turn, are the source of a number of problems for which no solutions are presently available in the prior art.

One major problem, for example, is the selection of suitable materials for the heat exchanger units which are subjected to a gas entry temperature of 950° C (850° C at minimum). Based upon the present state of metallurgical technology, no known materials are capable of withstanding such high temperatures over the required period of time — the intended life of the installation is 30 years. No such problems are present for the gas exit side of the heat exchanger unit, because there, the gas temperatures are considerably lower.

Another problem relates to the thermal insulation of the installation components subjected to the high temperatures of the reactor gas cooling circuit, i.e. the primary circuit.

SUMMARY OF THE INVENTION

A primary object of the present invention is to provide an improved nuclear powerplant design in which the aforementioned problems are overcome through a novel arrangement of the reactor component units and gas conduits, which makes it possible to economically operate a nuclear power station for the generation of process heat for an acceptable number of years.

It is also an object of the invention to provide an installation which is as compact as possible in its overall space requirements.

In accomplishing the foregoing and other objects, there has been provided in accordance with the present invention a nuclear power generator in which the gas cooling circuit, or primary circuit, is subdivided into several identical partial circuits, each having arranged in series a high temperature heat exchanger unit, a low temperature heat exchanger unit, and a blower, as well as the necessary gas conduits, the components of these partial circuits being removably mounted inside vertical shafts or pods located in regular angular spacing around the high-temperature reactor. The high temperature components and the low temperature components of each sectional heat exchanger unit are preferably arranged in separate shafts and the associated blowers are positioned underneath the low temperature side of the heat exchangers, and lastly, the return flow of the comparatively cold gas from the blowers to the high temperature reactor leads in part through the vertical shafts or pods of the installation, so that the returning gas provides a thermally insulating flow around the components subject to high temperatures.

The entire primary circuit thus consists of a number of identical and independent partial circuits which are linked together only through the high temperature reactor itself. The separation of the heat exchanger units of each partial circuit into high temperature and low temperature components makes it possible to design both heat exchanger components in accordance with their specific heat loads, for optimal usage of the available materials, each component being separately accessible and interchangeable from above, because each has its own shaft or pod wherein it is mounted.

The gas temperatures in the high temperature heat exchanger are above 600° throughout, so that only very expensive materials are suitable for this component. And because even the best presently available materials do not have adequate stability for the intended operational life of 30 years, it becomes necessary to replace the high temperature heat exchanger at predetermined intervals. Such replacement is greatly facilitated in the arrangement of the present invention, through the possibility of removing the old unit and mounting a new unit from above the vessel, so that the high temperature heat exchanger components need not be designed for the full life expectancy of the overall reactor installation.

The low temperature portion of the heat exchanger unit is obviously not subject to the same material stability problems and, consequently, the low temperature heat exchanger can be made of less expensive material and from thinner material gauges, while being still designed for the full life expectancy of the entire installation. The proposed arrangement provides that this heat exchanger component, too, be accessible and removable from the upper end of its mounting shaft.

Both heat exchanger components are designed as countercurrent heat exchangers, using a compartmented arrangement. For access and replacement purposes, however, each heat exchanger component represents a separate unit.

Access to, and removal of the blower, which is a comparatively light-weight component, is provided from underneath the low temperature heat exchanger, the blower being removable downwardly. Each of the constituent components of a sectional cooling circuit is thus separately removable.

The secondary circuit, receiving the energy from the primary circuit in the heat exchangers, links the primary circuit with process circuits and steam turbine circuits which are located outside the reinforced concrete vessel and its surrounding safety vessel. The present invention, however, concerns itself only with that portion of the overall installation which is arranged inside the safety vessel, so that a specific description of the process circuits and steam turbine circuits is not deemed necessary in connection herewith.

In general, it can be said that a nuclear power generator, with a heat transfer system designed in accordance with this invention, is characterized by a high operational safety factor, because it has several partial primary circuits which are interconnected only in the reactor core itself, with as many independent secondary circuits receiving their energy from the sectional primary circuits.

Inside the reinforced concrete vessel, the high temperature components and low temperature components of each heat exchanger unit are mounted at the level of the reactor core, so as to be parallel to each other. In this manner, it is possible to keep the conduits for the hot gas as short as possible, thereby minimizing the heat loads to which the concrete is subjected. For this purpose, all gas conduits linking the several vertical shafts or pods, as well as those which lead from the centrally located high temperature reactor to the several pods which hold the high temperature heat exchanger components, are straight and horizontal, meaning that the arrangement features extremely short connecting conduits between the components of the installation.

The hot gas conduits leading from the high temperature reactor to the high temperature heat exchangers are channels which exit radially from underneath the reactor cavity, entering the shafts of the high temperature heat exchangers from the bottom end of each. The second gas conduit leads from the upper end of the high temperature heat exchangers to the serially connected low temperature heat exchangers, this second gas conduit being designed as a coaxial pipe. Thus, the hot gas exiting from the nuclear reactor core first passes through the radial hot gas pipes into the lower ends of the high temperature heat exchangers, flowing around the tubing of the secondary circuit, whereupon the gas, now cooled down to a median temperature, exits from the upper end of the high temperature heat exchangers, flowing through the inner pipes of the coaxial gas conduits into the upper end of the low temperature heat exchanger. Here, the gas flows downwardly on the outside of heat exchanger tubing, being cooled still further as it reaches the gas blower at the lower end of the low temperature heat exchanger.

The return flow of the cooling gas from the blower to the high temperature reactor core involves, initially, a separation of each stream into two partial gas streams which are ultimately re-combined inside a space above the high temperature heat exchanger and which, from there, pass through the radial conduits into a gas collecting space at the upper end of the reactor core cavity.

One of the two partial gas streams downstream of the gas blower is lead through a conduit which connects the two shafts comprising each heat exchanger unit, from where it reaches an annular gap between the high temperature heat exchanger and its shaft wall, flowing through said gap into the space above the high temperature heat exchanger, where it is reunited with the other gas stream. The latter first flows through a similar annular gap between the low temperature heat exchanger and its associated shaft wall to the upper end of the shaft, where it enters the outer coaxial pipe of the gas conduit and then flows from there into the space above the high temperature heat exchanger.

This novel arrangement of the gas return flow from the blowers to the reactor core thus provides for the relatively cold gas to flow around the components which are subjected to high temperatures, thereby considerably reducing the problems of thermal insulation of these components.

In a preferred embodiment of the invention, which is based upon a nuclear power installation having an energy output of 2000 megawatts, the primary circuit portion of the installation consists of four identical primary circuits having heat exchanger units arranged in a circle around the reactor core, spaced by 90° angles inside the reactor vessel of reinforced concrete. The mounting shafts of the four high-temperature heat exchangers are arranged on a first, smaller radius, whereas those for the four low-temperature heat exchangers are arranged on a second, larger radius. All vertical shafts, or pods, are closed at their upper and lower ends by means of pressure resistant, gas-tight covers. Access to any of the components is obtained by removing the appropriate cover, whereupon the heat exchanger component or the blower, respectively, is then removable as a unit after the appropriate gas conduits have been disconnected.

The piping for the secondary circuit preferably runs through the aforementioned shaft covers. The gas of the secondary circuit runs through the piping of the heat exchanger units, in a direction opposite to that of the primary cooling gas. Upon entering the reactor vessel, the gas of the secondary circuit first reaches the low temperature heat exchanger, where it flows from the bottom to the top and is heated to an intermediate temperature. Then it passes through the high temperature heat exchanger. Also inside the tubes, being from top to bottom therein, before it leaves the reactor vessel, heated to a maximum temperature.

The invention further provides that the vertical shafts for the accommodation of the heat exchanger components, as well as the reactor core cavity itself, and the gas conduits, be equipped with gas-tight steel liners. Any pressures generated during operation are thus transmitted to the concrete of the vessel. However, in order to prevent the generation of unacceptably high temperatures in the concrete, the steel liners are further provided with insulating layers on their inner side and are cooled with water on their side facing the concrete. The fact that comparatively cool returning gas flows in the annular gaps between the heat exchanger components and the insulated steel liners of the mounting shafts reduces the thermal insulation problem to manageable proportions.

The present invention further provides for the arrangement inside the reinforced concrete vessel of an auxiliary or backup cooling system, the constituent components of which are basically known and which includes a blower, a check valve, and a cooler. This emergency cooling system which is operationally independent of the primary cooling circuit, serves for the removal from the reactor of the after-reaction heat which is generated during reactor breakdown and as long as the reactor is shut down. During normal operation of the nuclear reactor installation, this emergency cooling system receives a small reverse bypass flow from the returning reactor cooling gas. This emergency heat removal system, having a capacity of four times 50 percent, is subdivided into four shafts or pods, which are again regularly spaced around the reactor cavity and which are located angularly between the heat exchanger units of the primary cooling system. All in all, the entire installation thus consists of twelve vertical pods, the four last-mentioned pods for the emergency heat removal system being smaller than the eight pods of the heat exchanger units.

BRIEF DESCRIPTION OF THE DRAWINGS

A preferred embodiment of the invention is illustrated in the accompanying drawings, where a nuclear power generator embodying the invention is shown schematically. In the drawings, the invention is represented in the various figures as follows.

DESCRIPTION OF THE PREFERRED EMBODIMENT

Figure 1:
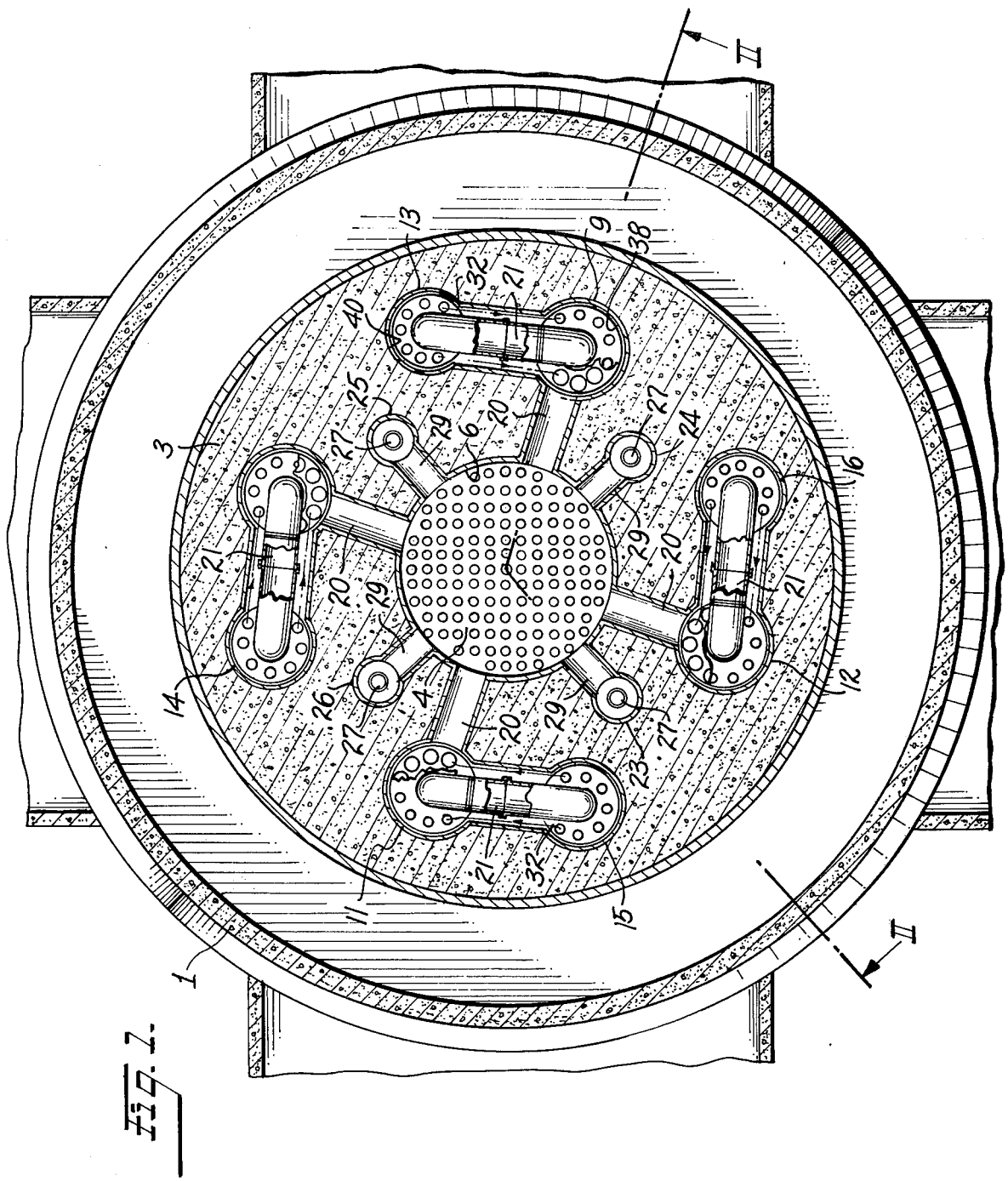
FIG. 1 shows the installation in a horizontal cross-section taken along line I—I of FIG. 2.
Figure 2:
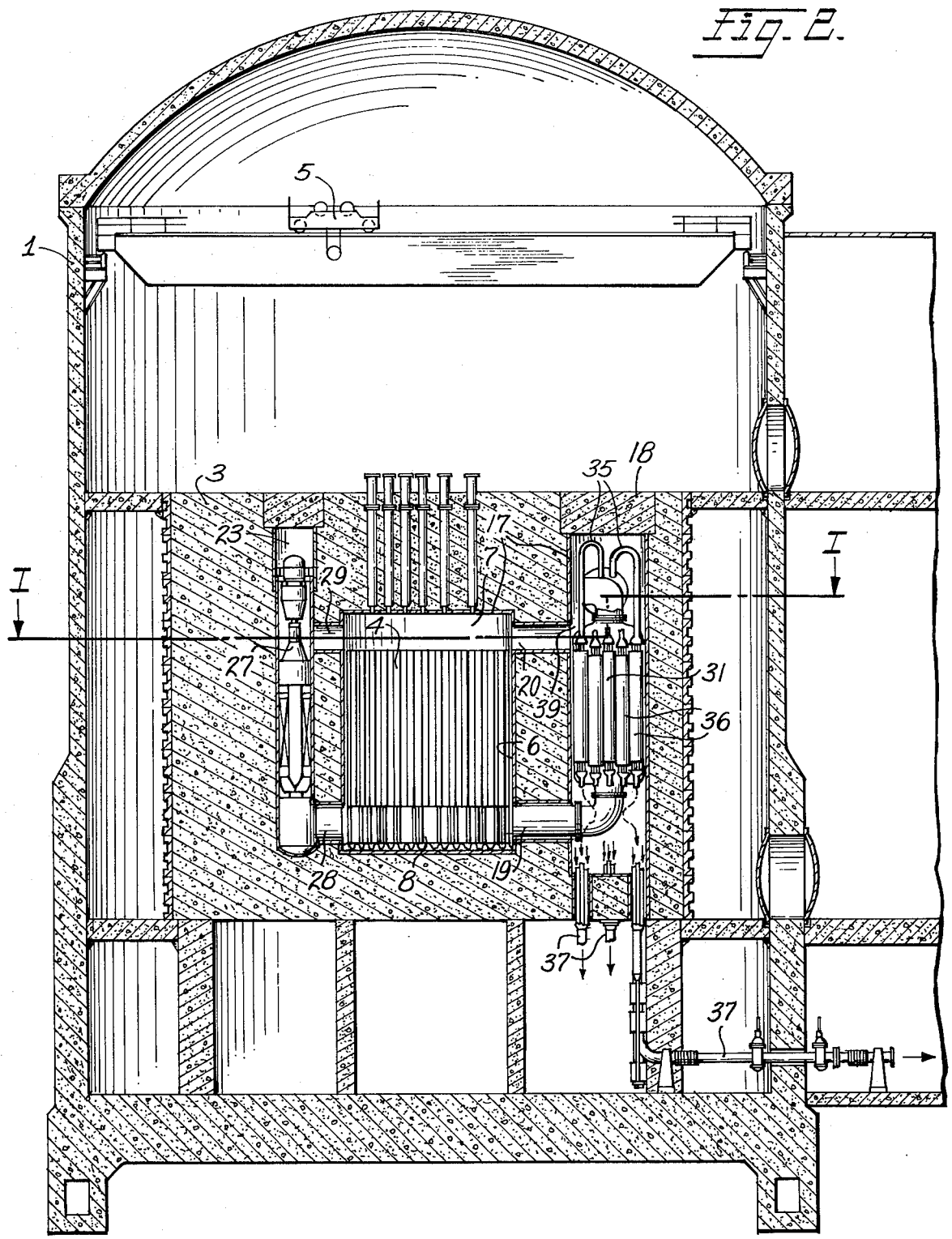
FIG. 2 is a vertical cross-section taken along line II—II of FIG. 1.

In FIGS. 1 and 2 is shown a nuclear power generator consisting of a pressure resistant safety vessel 1 of steel-reinforced concrete, whose cylindrical main body carries a roof 2 in the shape of a section of a sphere. In the center of this safety vessel 1 is arranged a likewise cylindrical burst-proof reinforced concrete vessel 3 surrounding a helium-cooled high temperature reactor core 4 with block-shaped heating and reflecting elements, as well as the associated main circuit components, including heat exchanging units, blowers, and gas conduits, which will be described in more detail hereinbelow. Likewise arranged inside the safety vessel 1 are all other auxiliary units which carry active gas and such materials handling installations as are necessary for the assembly and removal of main circuit components. Of the latter, only a rotating overhead crane for the manipulation of component units is shown (FIG. 2), the latter being supported on a ring shoulder underneath the spherical roof 2 of the safety vessel 1. The working radius of the crane 5 is large enough to service all the removable components located inside the safety vessel 1.

The high temperature reactor 4 itself is received inside a reactor cavity 6. Above the reactor core is provided a gas collecting chamber 7 through which the cold helium enters the reactor itself. Underneath the bottom of the reactor core 4 is arranged a column chamber 8 inside of which the heated helium is collected before leaving the reactor. Four radially regularly spaced intake conduits and an equal number of exit conduits link the nuclear reactor core 4 with the surrounding components of the main circuit.

In order to accommodate these additional components of the main cooling circuit, the vessel 3 is provided with four vertically extending shafts or pods 9, 10, 11 and 12, respectively, which are arranged on the circumference of a circle around the reactor cavity 6 and which are spaced 90° apart. On a somewhat larger concentric circle are arranged four additional vertical pods 13, 14, 15 and 16, respectively, which are angularly spaced from the first four pods 9–12. These eight large vertical openings in the vessel 3, as well as the reactor cavity 6 itself, are equipped with water cooled, thermally insulated steel liners 17, and each opening is covered with a burst-proof lid 18 which is attached to the vessel by means of plural fasteners.

Figure 3:
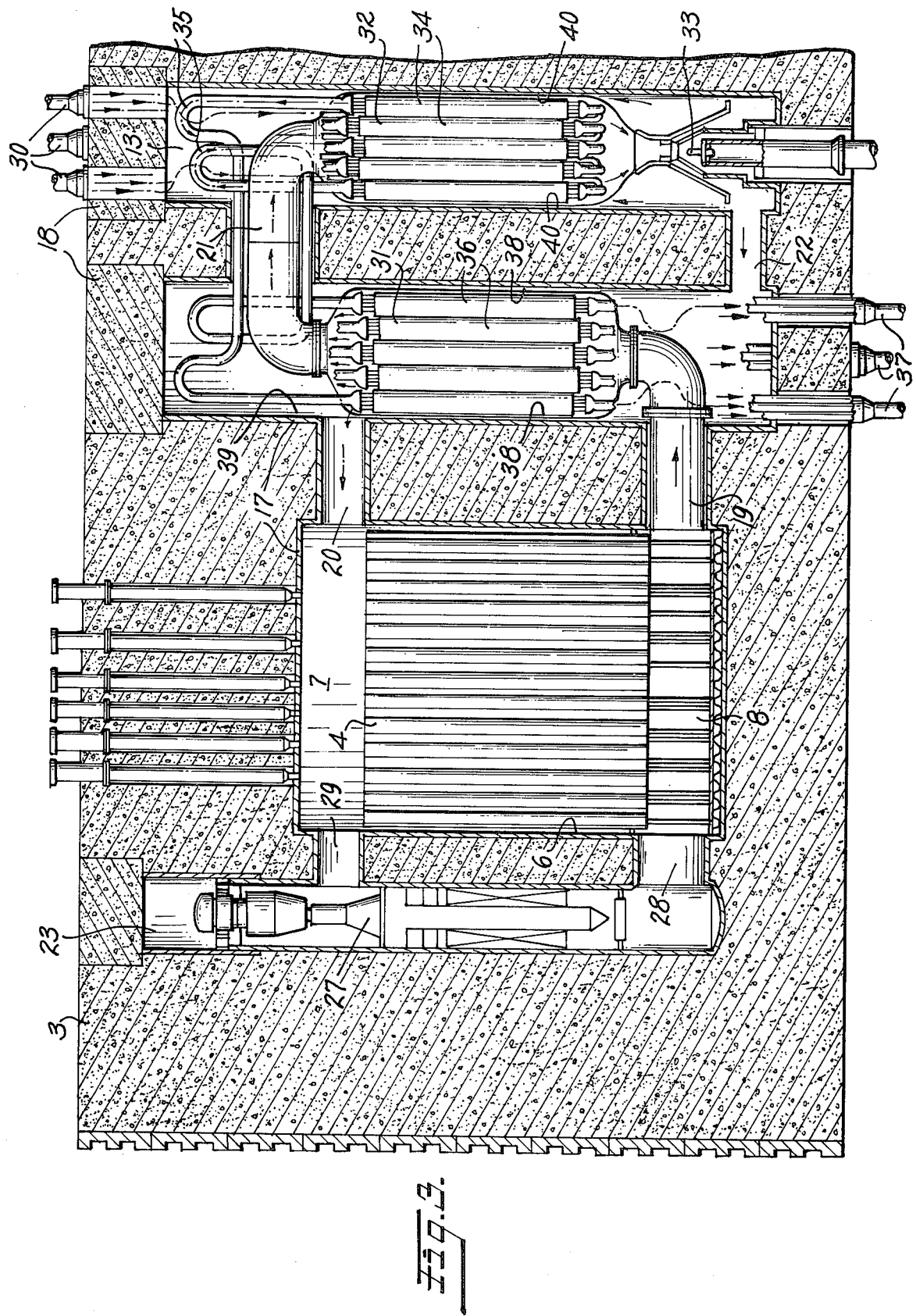
FIG. 3 is comparable to FIG. 2, showing a "developed" cross-sectional representation.

In each of the four shafts 9–12 is arranged a high temperature heat exchanger 31 which constitutes part of each heat exchanger unit consisting of a high temperature heat exchanger component 31 and a low temperature heat exchanger component 32. The low temperature heat exchangers are arranged in series with respect to the high temperature components and are removably installed inside the second set of vertical shafts 13–16. Each heat exchanger unit thus comprises two adjacently located vertical shafts 10/14, 11/15, etc. As can be seen in FIG. 3, each heat exchanger unit is further associated with a gas blower 33 which is arranged underneath its low temperature heat exchanger component 32, inside the corresponding shaft openings 13–16. The blower 32 is preferably a single-stage axial compressor which is arranged for convenient access and removal from the bottom side of the vessel 3.

The vertical shafts or pods 9–12 are connected to the column chamber 8 of the reactor core 4 through four short horizontal hot gas conduits 19. Another set of four radial gas-return conduits 20 communicates with the gas collection chamber 7 on top of the reactor core 4. A set of connecting conduits 21, arranged above the gas return conduits 20, links the pods 9–12 with the adjacent pods 13–16, respectively, i.e. connecting each high temperature heat exchanger with a low temperature heat exchanger. These connecting conduits are arranged as coaxial double pipes. An additional set of connecting conduits 22 also links the high temperature pods 9–12 with the low temperature pods 13–16.

The entire primary circuit is thus subdivided into four identical partial cooling circuits which are connected together through the collecting chamber 7 of the reactor core 4, and which each comprises a high temperature heat exchanger component 31, a low temperature heat exchanger component 32, a blower 33, and associated gas conduits 19, 20, 21 and 22, respectively.

Four additional, auxiliary vertical pods 23, 24, 25 and 26 are arranged around the reactor core 4, on a radius which is somewhat smaller than the radius of the pods 9–12, the former being again arranged at regular 90° angular spacing. These auxiliary pods accommodate an auxiliary heat removal system 27 which is not comprised within the scope of this invention and is therefore not specifically described herein. Each auxiliary pod is connected to the reactor core 4 by means of radial gas conduits 28 and 29 and designed to remove 50 percent of the after-reaction heat from the reactor.

A secondary circuit, likewise using helium as heat carrying medium, is associated with the primary circuit in a countercurrent interraction, as is illustrated schematically in FIG. 3. The cold secondary gas enters the vessel 3 initially through pipes 30 arranged in the lids 18 of the pods 13–16, where the gas is subdivided into a plurality of smaller pipes which run downwardly along the wall of the low temperature heat exchanger 32, where they enter the heat exchanger 32 itself through distributor heads connecting them to the tube bundles 34 of the heat exchanger element. Corresponding collecting heads and connecting pipes 35 on the upper end of the low temperature heat exchanger 32 bring the helium, now heated to a median temperature, to the upper end of the high temperature heat exchangers 31, where the secondary gas passes downwardly through tube bundles 36, the helium now being heated to its maximum temperatures. Exit pipes 37 finally lead the hot secondary gas to the outside of the concrete vessel 3 and to a station (not shown) where this heat is further processed.

Figure 4:
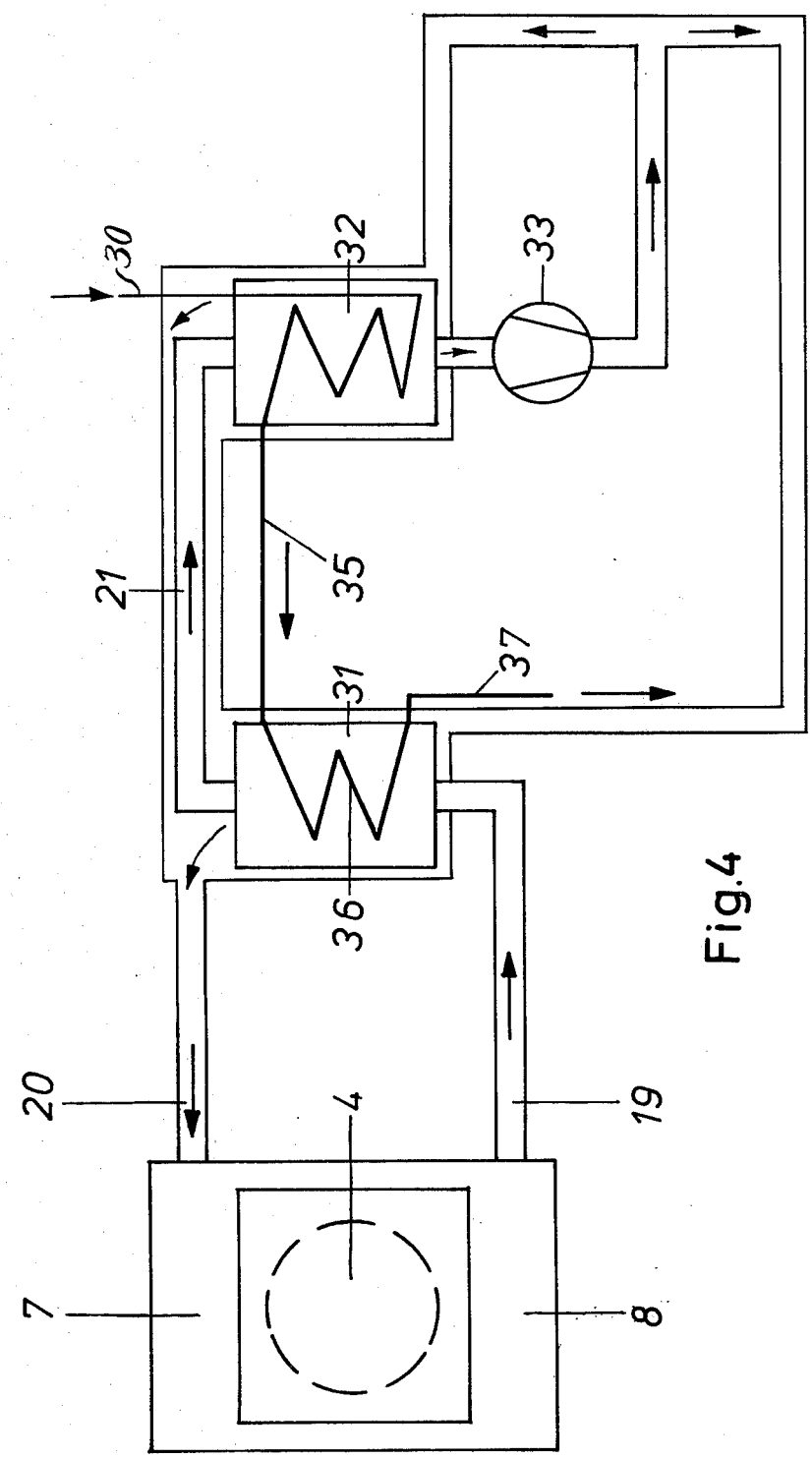
FIG. 4 shows the primary cooling circuit in a flow diagram.

In the following will be described the circulation of the primary gas and the one of the four identical primary circuit sections of the reactor, referring in particular to FIG. 4 and to FIG. 3 as well as to the remainder of the figures. The cold helium enters with a temperature of 410° C and a pressure 39.9 bar into the collecting chamber 7 above the reactor core 4, passing downwardly through the reactor core itself, and is heated. The heated gas is collected in the column chamber 8. From there, the hot gas is distributed to the four hot gas conduits 19 of four identical parallel circuit sections. With a temperature of 95° C and a pressure of 39.1 bar, the hot helium passes through the hot gas conduit 19 into the lower end of the high temperature heat exchanger 31. Here, some of the heat is transferred through the tube bundles 36 to the counter-flowing helium of the secondary circuit, so that the primary gas is cooled to a median temperature. This gas then flows through the inner pipe of the coaxial upper connecting conduit 21 to the low temperature heat exchanger 32, where it enters with a temperature of 700° C and a pressure of 33.9 bar. Here again, the primary gas flows along the shell side of the heat exchanger, but from top to bottom. The counterflowing secondary gas further cools the primary gas, which now leaves the low temperature heat exchanger with a temperature of 410° and a pressure of 38.6 bar. The blower 33 in the primary circuit, arranged underneath the low temperature heat exchanger 32, compresses the gas to a maximum circulation pressure of 40 bar; its temperature thereby increases to 408° C.

The return flow of the primary cooling gas from the blower 33 to the reactor core 4 takes place in two sectional gas streams. Approximately one-half of the return stream is guided through the lower connecting conduit 22 into the vertical shaft of the high temperature heat exchanger 9, or 10, etc., where it passes through an annular gap 38 between the high temperature heat exchanger 31 and the steel liner 17 into a head space 39 above the high temperature heat exchanger. The other sectional gas stream first passes through a similar annular gap 40 between the low temperature heat exchanger 32 and its associated steel liner 17 inside the shaft 13, or 14, etc., arriving at the upper end of the shaft, where it enters the outer pipe space of the coaxial upper connecting conduit 21, passing from there into the head space 39. The two partial gas streams are now re-combined inside space 39 above the high temperature heat exchanger 31, entering thereupon the radial gas return conduit 20 through which they pass into the gas collecting chamber 7 above the reactor core 4.

The helium of the secondary circuit, entering the heat exchanger through the pipes 30 above the low temperature heat exchanger 32, with a temperature of 250° C and a pressure of 42.5 bar, leaves the high temperature heat exchanger 31 with a temperature of 900° C and a pressure of 40 bar.

It should be understood, of course, that the foregoing disclosure describes only a preferred embodiment of the invention and that it is intended to cover all changes and modifications of this example of the invention which fall within the scope of the appended claims.

What is claimed is:

1. A powerplant having a closed gas-cooling circuit for the production of process heat at high temperatures on the order of at least about 850° C., which process heat is to be transferred to a secondary working fluid circuit by means of heat exchange techniques, said powerplant comprising:

a. a vessel comprising a generally solid block of material;
   b. a high-temperature nuclear reactor positioned within said vessel;
   c. a plurality of heat exchanger units positioned about said reactor in said vessel, said heat exchanger units comprising each a high temperature heat exchanger fabricated from materials capable of withstanding said high temperatures and a low temperature heat exchanger coupled serially therewith, each of said heat exchanger units being removably mounted in a vertically oriented shaft in the wall of said solid block vessel;
   d. first means for conducting a portion of a hot gas stream leaving said reactor directly to each of said high temperature heat exchangers where said hot gas is partially cooled by indirect contact with a working fluid in said secondary circuit;
   e. second means for conducting said cooled gas from each of said high temperature heat exchangers to said low temperature heat exchangers coupled therewith where said gas is further cooled by indirect contact with said secondary circuit fluid; and
   f. means for returning said further cooled gas to said reactor from each of said low temperature heat exchangers by circulating said gas around the periphery of each respective heat exchanger unit.

2. The powerplant as defined by claim 1, wherein said heat exchanger units are symmetrically positioned around said high temperature reactor and each of said high temperature heat exchangers and each of said low temperature heat exchangers is mounted in a separate shaft.

3. The powerplant as defined in claim 2, wherein said means for returning said further cooled gas includes a blower for said gas mounted beneath each of said low temperature heat exchangers.

4. A powerplant having a closed gas-cooling circuit for the production of process heat to be transferred to a secondary circuit, comprising:
   a. a vessel comprising a generally solid block of material;
   b. a high-temperature nuclear reactor positioned within said vessel;
   c. a plurality of heat exchanger units positioned symmetrically about said reactor in said vessel, said heat exchanger units comprising each a high temperature heat exchanger and a low temperature heat exchanger coupled serially therewith, each of said heat exchangers of said units being removably mounted in a separate vertically oriented shaft in said material;
   d. first means for conducting a portion of a hot gas stream leaving said reactor to each of said high temperature heat exchangers where said hot gas is partially cooled by indirect contact with a working fluid in said secondary circuit;
   e. second means for conducting said cooled gas from each of said high temperature heat exchangers to said low temperature heat exchangers coupled therewith where said gas is further cooled by indirect contact with said secondary circuit fluid; and
   f. means for returning said further cooled gas to said reactor from each of said low temperature heat exchangers by circulating said gas around the periphery of each respective heat exchanger unit, said cooled gas returning means including a blower for said gas mounted beneath each of said low temperature heat exchangers and means to circulate a first portion of said further cooled gas leaving each of said blowers around the periphery of the above-located low temperature heat exchanger and a second portion around the periphery of the serially connected high temperature heat exchanger.

5. The powerplant as defined by claim 4, wherein said high temperature reactor is a nuclear reactor.

6. The powerplant as defined by claim 2, wherein each of said high temperature and low temperature heat exchangers is mounted at approximately the same height as said reactor.

7. The powerplant as defined by claim 2, wherein said first and second conducting means and said returning means include gas conveying conduits and wherein each of said conduits is made up of vertical and horizontal sections.

8. The powerplant as defined by claim 7, wherein said first conducting means includes a plurality of conduits extending radially from beneath said reactor, one of said conduits entering each of said high temperature heat exchanger shafts at its lower end.

9. The powerplant as defined by claim 7, wherein said second conducting means includes a conduit exiting from the upper end of each of said high temperature heat exchanger shafts, said conduit being internally coaxial with respect to another conduit.

10. The powerplant as defined by claim 4, wherein said returning means includes a gas collection chamber positioned above said reactor and a conduit radially converging to said chamber from each of said high temperature heat exchanger shafts.

11. The powerplant as defined by claim 9, wherein said returning means includes an annular space around each of said low temperature and high temperature heat exchanger shafts for passage of said further cooled gas and a conduit connecting the annular space of each low temperature heat exchanger shaft with the annular space of the shaft of its coupled high temperature heat exchanger, each of said annular space connecting conduits being externally coaxial with respect to one of said internally coaxial gas conducting conduits.

12. The powerplant as defined by claim 4, wherein there are four of said heat exchanger units arranged at 90° radial angles from one another.

13. The powerplant as defined by claim 4, wherein each of said shafts comprises pressure-and gas-tight covers at top and bottom.

14. The powerplant as defined by claim 13, wherein the cover at the top of each of said low temperature heat exchanger shaft includes means for permitting entry of said secondary circuit working fluid.

15. The powerplant as defined by claim 4, wherein said vessel is a reinforced concrete vessel and wherein each of said shafts comprises a gas-tight steel liner having water-cooling means on its external surface and heat protective means on its inner surface.

16. The powerplant as defined by claim 4, further comprising within said vessel an auxiliary cooling system comprising a blower, a check-valve and a cooler.

17. The powerplant as defined by claim 16, wherein said auxiliary cooling system comprises four partial systems positioned in four separate vertical shafts symmetrically arranged around said reactor at positions intermediate said heat exchanger units.

18. The powerplant as defined by claim 4, wherein each of said high temperature and low temperature heat exchangers is mounted at approximately the same height as said reactor.

19. The powerplant as defined by claim 4, wherein said first and second conducting means and said returning means include gas conveying conduits and wherein each of said conduits is made up of vertical and horizontal sections.

20. The powerplant as defined by claim 19, wherein said first conducting means includes a plurality of conduits extending radially from beneath said reactor, one of said conduits entering each of said high temperature heat exchanger shafts at its lower end.

21. The powerplant as defined by claim 19, wherein said second conduting means includes a conduit exiting from the upper end of each of said high temperature heat exchanger shafts, said conduit being internally coaxial with respect to another conduit.

22. The powerplant as defined by claim 4, wherein said returning means includes a gas collection chamber positioned above said reactor and a conduit radially conveying to said chamber from each of said high temperature heat exchanger shafts.

23. The powerplant as defined by claim 21, wherein said returning means includes an annular space around each of said low temperature and high temperature heat exchanger shafts for passage of said further cooled gas and a conduit connecting the annular space of each low temperature heat exchanger shaft with the annular space of the shaft of its coupled high temperature heat exchanger, each of said annular space connecting conduits being externally coaxial with respect to one of said internally coaxial gas conducting conduits.

* * * * *